US005585334A

United States Patent [19]
Shaw

[11] Patent Number: 5,585,334
[45] Date of Patent: Dec. 17, 1996

[54] PROCESS FOR DISSOLVING SULFUR

[75] Inventor: James E. Shaw, Bartlesville, Okla.

[73] Assignee: Phillips Petroleum Company, Bartlesville, Okla.

[21] Appl. No.: 426,210

[22] Filed: Apr. 21, 1995

[51] Int. Cl.$^6$ .................................................. C09K 7/00
[52] U.S. Cl. ........................ 507/257; 507/258; 507/261; 507/277; 507/932
[58] Field of Search ...................... 507/257, 261, 507/932, 258, 277

[56] References Cited

U.S. PATENT DOCUMENTS

| | | | |
|---|---|---|---|
| 3,846,311 | 11/1974 | Sharp et al. | 507/257 |
| 3,909,422 | 9/1975 | Sample, Jr. | 507/277 |
| 4,239,630 | 12/1980 | Atkinson et al. | 507/257 |
| 4,248,717 | 2/1981 | Sharp et al. | 507/257 |
| 4,290,900 | 9/1981 | Sharp et al. | 507/257 |
| 4,804,485 | 2/1989 | Carroll et al. | 507/257 |
| 4,876,389 | 10/1989 | Gongora et al. | 568/26 |
| 5,028,343 | 7/1991 | Lindstrom | 507/257 |
| 5,104,557 | 4/1992 | Lindstrom | 507/261 |
| 5,186,848 | 2/1993 | Carroll et al. | 507/257 |
| 5,232,623 | 8/1993 | Shaw | 252/183.13 |

*Primary Examiner*—Philip Tucker
*Attorney, Agent, or Firm*—Lucas K. Shay

[57] ABSTRACT

A process which can be used to dissolve sulfur deposits or sulfur plugs in gas wells, oil wells, vessels, or conduits for transporting a fluid containing sulfur is provided. The process comprises contacting the sulfur deposits or sulfur plugs under conditions sufficient to dissolve sulfur wherein the composition comprises an organic sulfide, a base, a surfactant, and optionally, a mercaptan and is present in an amount effective to dissolve sulfur.

29 Claims, No Drawings

PROCESS FOR DISSOLVING SULFUR

FIELD OF THE INVENTION

The present invention relates to a process for dissolving sulfur. The process can be used in dissolving sulfur deposits or plugs in oil wells, gas wells, conduits for transporting a fluid, vessels, or combinations of any two or more thereof.

BACKGROUND OF THE INVENTION

Sulfur deposits or plugs are generally found in oil wells, gas wells, conduits through which gas streams containing sulfur flow, pipelines through which hydrocarbons containing sulfur are transported, and vessels in which sulfur-containing fluids are stored. The deposits or plugs reduce the flow of hydrocarbons and can severely shut off the oil or gas recovery or the transportation of a fluid.

Various processes and sulfur-dissolving compositions have been developed to alleviate the sulfur deposit or plugging problems. For example, acid has been used in combination with a compound that, upon contact with the acid, liberates carbon disulfide for dissolving sulfur. Organic solvents such as naphthalenes, hot oils, dialkyl disulfides and amine, and mixture of organic disulfides or polysulfides and polyamines have also been used to dissolve sulfur deposits or plugs. However, these processes either require a length period to dissolve sulfur or employ chemicals that are not environmentally friendly. Therefore, there is an ever-increasing need to develop a more effective process for dissolving sulfur deposits or plugs.

SUMMARY OF THE INVENTION

An object of the present invention is to provide a process for dissolving sulfur deposits or plugs. Another object of the invention is to provide a process for dissolving sulfur deposits or plugs that occur in a gas well, an oil well, vessels for storage of sulfur-containing products such as polysulfides or molten sulfur, a pipeline for transporting hydrocarbons, or other conduits through which a hydrocarbon or fluid containing sulfur flows. A further object of the present invention is to provide a composition for dissolving sulfur deposits or plugs. One of the advantages of the present invention is that the composition used in the present invention comprises a surfactant which facilitate the sulfur dissolution. Other objects and advantages will become more apparent as the invention is more fully disclosed hereinbelow.

According to an embodiment of the present invention, a process which can be used for dissolving a sulfur deposit or plugs in a gas well, an oil well, a conduit, or combinations of any two or more thereof is provided. The process comprises contacting a composition with sulfur under conditions sufficient to dissolve the sulfur wherein the composition comprises an organic sulfide, a base, a surfactant, and optionally, a mercaptan and is present in an amount effective to dissolve sulfur.

According to another embodiment of the present invention, a composition, which can be used for dissolving sulfur, is provided. The composition comprises an organic sulfide, a base, a surfactant, and optionally, a mercaptan and is present in an amount effective to dissolve sulfur.

DETAILED DESCRIPTION OF THE INVENTION

The term "fluid" used herein refers to, unless otherwise indicated, a gas, a liquid, or combinations thereof wherein the liquid can be an organic liquid, an aqueous liquid, or combinations thereof and can be a solution, a suspension containing undissolved solids, an emulsion, or combinations thereof. For example, crude oils, natural gas, molten sulfur, and organic polysulfides are within the meaning of the term.

According to an embodiment of the present invention, a process for dissolving sulfur is provided which comprises contacting sulfur with a composition which comprises, or consisting essentially of, an organic sulfide, a base, and a surfactant. The process of the present invention can be used in, for example, oil wells, gas wells, conduits, vessels, or combinations thereof. It can also be used to clean units that are used for producing sulfur.

According to the present invention, an organic sulfide compound is defined as a sulfur-containing compound having the formula of $R-S_n-R$, wherein each R can be the same or different and is each a hydrocarbyl radical having 1 to about 30, preferably about 1 to about 20, and most preferably 1 to 15 carbon atoms and n is a number from 2 to about 10, preferably in the range of from about 2 to about 8, more preferably from 2 to 5, and most preferably 2. The hydrocarbyl radical can be linear or branched and can be alkyl, aryl, cycloalkyl, alkaryl, aralkyl, alkenyl radicals, or combinations of any two or more thereof. Preferably the hydrocarbyl radical is an alkyl radical.

Examples of suitable organic sulfides include, but are not limited to, dimethyl disulfide, diethyl disulfide, diisopropyl disulfide, di-n-propyl disulfide, di-n-butyl disulfide, di-n-amyl disulfide, di-t-butyl disulfide, di-t-amyl disulfide, di-n-hexyl disulfide, dicyclohexyl disulfide, didecyl disulfide, didodecyl disulfide, di-t-dodceyl disulfide, diphenyl disulfide, dibenzyl disulfide, ditoluyl disulfide, dimethyltrisulfide, dimethyl tetrasulfide, dimethyl pentasulfide, diethyl trisulfide, diethyl tetrasulfide, diethyl pentasulfide, dipropyl trisulfide, dipropyl tetrasulfide, dipropyl pentasulfide, di-t-butyl trisulfide, di-t-butyl tetrasulfide, di-t-butyl pentasulfide, dinonyl trisulfide, dinonyl tetrasulfide, dinonyl pentasulfide, and combinations of any two or more thereof. The presently most preferred organic disulfide is dimethyl disulfide.

According to the present invention, any base that can catalyze dissolving sulfur can be used. The presently preferred base can be an inorganic base, an organic base, or combinations of any two or more thereof. The presently more preferred bases are bases that can ionize in a medium. Suitable organic bases include, but are not limited to, tetramethylammonium hydroxide, tetraethylammonium hydroxide, tetrapropylammonium hydroxide, tetramethylammonium bisulfide, tetraethylammonium bisulfide, lithium hydroxide, sodium hydroxide, sodium hydrosulfide, sodium bisulfide, potassium hydroxide, calcium hydroxide, magnesium hydroxide, sodium bicarbonate, sodium carbonate, sodium oxide, sodium sulfide, magnesium oxide, calcium oxide, calcium carbonate, sodium phenoxide, barium phenoxide, calcium phenoxide, $R^1OM$, $R^1SM$, and combinations of any two or more thereof; where $R^1$ is a $C_1$–$C_{18}$ alkyl radical, or combinations of any two or more thereof and M is an alkali metal, an alkaline earth metal, or combinations of any two or more thereof. Among the bases, sodium hydroxide, sodium hydrosulfide, and sodium methanethiolate are preferred because they are readily available and inexpensive.

The composition useful in the production of an organic polysulfide also comprises a surfactant. According to the present invention, any surfactant that facilitates the mixing of reactants into substantially a single phase can be used.

Generally, the surfactant comprises one or more compounds which exhibit surface-active properties. A preferred surfactant for use in the reaction system of the instant invention is selected from the group consisting of alkoxylated compounds, quaternary ammonium salts, alkali metal alkyl sulfates, alkali metal salts of alkanoic acids, alkali metal salts of alkaryl sulfonic acids, 1-alkyl pyridinium salts, and combinations of any two or more thereof.

The presently preferred surfactant is an alkoxylated compound. Examples of suitable alkoxylated compounds include, but are not limited to, alkoxylated alcohols, alkoxylated mercaptans, sulfates of alkoxylated alcohols, alkoxylated phenols, sulfates of alkoxylated phenols, and combinations of any two or more thereof.

The alkoxylated alcohol useful in the present invention has a general formula of $R^2O[CH_2CH(R^3)O]_qH$ where $R^2$ is a $C_1$–$C_{20}$ hydrocarbyl radical selected from the group consisting of alkyl radical, alkylaryl radical, aryl radical, cycloalkyl radical, alkenyl radical, and combinations of any two or more thereof; Preferably $R^2$ is a $C_6$–$C_{18}$ alkyl radical. Most preferably $R^2$ is a $C_{10}$–$C_{16}$ alkyl radical; $R^3$ is selected from the group consisting of hydrogen, $C_1$–$C_{16}$ alkyl radicals, $C_2$–$C_{16}$ alkenyl radicals, and combinations of any two or more thereof; and q is a number of from 1 to about 20, preferably from about 2 to about 12, most preferably from 5 to 10. Generally $R^3$ can contain from 0 to about 16 carbon atoms. Preferably $R^3$ is a hydrogen or a $C_1$–$C_3$ alkyl radical. Most preferably $R^3$ is hydrogen. An example of suitable alkoxylated alcohol is TERGITOL® 15-S-7 which is an ethoxylated alcohol, is manufactured and marketed by Union Carbide Corporation, and has the formula of $R^2O(CH_2CH_2O)_7H$ where $R^2$ is a secondary alkyl radical having 11–15 carbon atoms and 7 is the averaged number of the ethylene oxide units. Another example is an ethoxylated phenol having the same number of ethylene oxide units. Other suitable alkoxylated alcohols are also available from Union Carbide Corporation.

The sulfate of alkoxylated alcohol useful in the present invention has a general formula of $R^2O[CH_2CH(R^3)O]_qSO_3M$ where $R^2$, $R^3$, and q are the same as those described above and M is an alkali metal or an alkaline earth metal or combinations of any two or more thereof. An example of suitable sulfate of alkoxylated alcohol is sodium sulfate of an ethoxylated alcohol having the formula of $R^2O(CH_2CH_2)_qSO_3Na$ in which $R^2$ and q are the same as those disclosed above.

Useful alkoxylated phenols and sulfates of alkoxylated phenols can have general formulas of $(R_3)_pArO[CH_2CH(R^3)O]_qH$ and $(R^2)_pArO[CH_2CH(R^3)]_qSO_3M$, respectively where $R^2$, $R^3$, q and M are the same as those disclosed above, Ar is a phenyl group and p is an integer ranging from 0 to 5. Examples of these alkoxylated phenols are ethoxylated phenol $ArO(CH_2CH_2O)_qH$ and sodium sulfate of ethoxylated phenol $ArO(CH_2CH_2O)_qSO_3Na$ where Ar and q are the same as disclosed above.

The alkoxylated mercaptan useful in the present invention has a general formula of $R^2S[CH_2CH(R^3)O]_qH$ where $R^2$, $R^3$, and q are the same as those described above. An example of an alkoxylated mercaptan is an ethoxylated mercaptan having the formula of $R^2S(CH_2CH_2O)_7H$ where $R^2$ is primarily a tertiary dodecyl group and 7 is the averaged number of ethylene oxide units. This ethoxylated mercaptan is a surfactant, commercially available from Phillips Petroleum Company, Bartlesville, Okla. under the trade name AQUA-CLEEN® II. Another example is an ethoxylated thiophenol having the same number of ethylene oxide units. Other suitable alkoxylated mercaptans are also available from Phillips Petroleum Company.

Quaternary ammonium salt useful in the present invention has the general formula $(R^4)_4N^+X^-$ where $R^4$ is an alkyl radical of from 1 to 20 carbon atoms; and X is selected from the group consisting of $Br^-$, $Cl^-$, $I^-$, $F^-$, $R^4CO_2^-$, $QSO_3^-$, $BF_4^-$, and $HSO_4^-$, where Q is an aryl, alkaryl or arylalkyl radical of 6 to 10 carbon atoms. It will be noted that a variety of anions are suitable as the component of the quaternary ammonium salts.

Useful quaternary ammonium salts according to the general formula given above include, but are not limited to, cetyltrimethylammonium bromide, hexadecyltrimethylammonium bromide, tetraheptylammonium bromide, cetyltrimethylammonium stearate, benzyltributylammonium chloride, benzyltriethylammonium bromide, benzyltrimethylammonium bromide, phenyltrimethylammonium bromide, phenyltrimethylammonium iodide, tetrabutylammonium bromide, tetrabutylammonium chloride, tetrabutylammonium hydrogen sulfate, tetrabutylammonium iodide, tetraethylammonium bromide, tetrabutyl ammonium fluoride, tetrabutylammonium tetrafluoroborate, and combinations of any two or more thereof.

An alkali metal alkyl sulfate of the general formula of $R^4OSO_3M$ can be used in the present invention, wherein $R^4$ and M are the same as those disclosed above. Examples of suitable compounds according to the general formula for the alkali metal alkyl sulfates include, but are not limited to, lithium decylsulfate, potassium dodecylsulfate, sodium dodecylsulfate, sodium hexadecylsulfate, potassium hexadecylsulfate, rubidium dodecylsulfate, cesium dodecylsulfate, sodium octadecylsulfate, potassium octadecylsulfate, potassium eicosylsulfate, sodium eicosylsulfate, and combinations of any two or more thereof.

Useful alkali metal salts of alkanoic acids have the general formula of $R^4CO_2M$, where $R^4$ and M have the same meaning as given above. Examples of suitable alkali metal salts of alkanoic acids include, but are not limited to, lithium decanoate, sodium dodecanoate, potassium dodecanoate, rubidium dodecanoate, cesium dodecanoate, sodium hexadecanoate, potassium hexadecanoate, sodium octadecanoate, potassium octadecanoate, sodium eicosanoate, potassium eicosanoate, and combinations of any two or more thereof.

Useful alkali metal salts of alkaryl sulfonic acids have the general formula of $(R^4)_pArSO_3M$ where $R^4$ and M are the same as those disclosed above, Ar is a phenyl group, and p is an integer ranging from 0 to 5.

Typical compounds within the group include, but are not limited to, sodium dodecylbenzenesulfonate, potassium dodecylbenzenesulfonate, lithium dodecylbenzenesulfonte, sodium tetradecylbenzenesulfonate, potassium hexadecylbenzenesulfonate, rubidium dodecylbenzenesulfonate, cesium dodecylbenzenesulfonate, sodium octadecylbenzenesulfonte, potassium octadecylbenzenesulfonate, sodium eicosylbenzenesulfonate, and combinations of any two or more thereof.

Examples of suitable 1-alkyl pyridinium salts include, but are not limited to, 1-dodecylpyridinium para-toluenesulfonate, 1-dodecylpyridinium chloride, 1-hexadecylpyridinium chloride, 1-hexadecylpyridinium paratoluenesulfonate, 1-decylpyridinium chloride, 1-hexadecylpyridinium bromide, 1-tetradecylpyridinium chloride, 1-octadecylpyridinium chloride, 1-eicosylpyridinium chloride, 1-octadecylpyridinium benzenesulfonate, and combinations of any two or more thereof The weight ratio of an organic sulfide to a surfactant can vary widely and can be any ratio that can catalyze the dissolution of sulfur. Generally the ratio can be in the range of from about 100,000:1 to about 1:1, preferably about 50,000:1 to about 2:1, more preferably about 20,000:1 to about 5:1, and most preferably 10,000:1 to 10:1. If a mixture of organic sulfides are used in the composition any weight ratios of a sulfide to another sulfide can be employed so long as the weight ratio of total sulfide to surfactant is in the range disclosed above.

The weight ratio of a base to a surfactant can vary widely so long as the ratio can catalyze the dissolution of sulfur, preferably from about 1:1 to about 1:100, more preferably from about 1:1 to about 1:50, and most preferably 1:1 to 1:20, for best results. If a mixture of bases or surfactants is used, the weight ratio can be any ratio that catalyzes the dissolution of sulfur and can be, for example, in the range of 1:1 to 999:1 for each base to other base or for each surfactant to other surfactant.

The amount of the composition required is the amount that can effectively dissolve the sulfur. Generally, the amount depends on the quantity of sulfur to be dissolved. It is preferred that the weight ratio of the composition to sulfur be in the range of from about 0.01:1 to about 100:1, more preferably about 0.1:1 to about 50:1, and most preferably 0.1:1 to 30:1.

The composition used in the present invention can be made by properly mixing the components in the ratio described above and employing any suitable mixing means such as shaking or stirring. The preparation can also be done in-situ, i.e., mixing the components of the composition in a medium containing an organic sulfide compound contemporaneously in contact with sulfur. Furthermore, a base can also be prepared in-situ such as, for example, combining methyl mercaptan or hydrogen sulfide with sodium hydroxide to prepare sodium methanethioate or sodium hydrosulfide in a medium containing an organic sulfide compound and sulfur reactants.

According to the process of the present invention, the composition used for dissolving sulfur can also comprise hydrogen sulfide or mercaptan if the base used in the composition is an alkali or alkaline metal hydroxide. Generally, any mercaptan that can react with an alkali metal hydroxide or alkaline earth metal hydroxide to form alkali metal sulfide or alkaline metal sulfide can be used. Suitable mercaptans have the formula of RSH wherein R is the same as disclosed above. Examples of suitable mercaptans include, but are not limited to, methyl mercaptan, ethyl mercaptan, propyl mercaptan, butyl mercaptan, isopropyl mercaptan, isobutyl mercaptan, t-butyl mercaptan, amyl mercaptan, isoamyl mercaptan, hexyl mercaptan, cyclohexyl mercaptan, octyl mercaptan, nonyl mercaptan, t-nonyl mercaptan, decyl mercaptan, dodecyl mercaptan, t-dodecyl mercaptan, t-tetradodecyl mercaptan, phenyl acetyl mercaptan, p-methyl phenyl mercaptan, and combinations of any two or more thereof. The amount of hydrogen sulfide or mercaptan is the amount that can catalyze sulfur dissolving and generally has about equal molar ratio of hydrogen sulfide or mercaptan to base.

Conditions for contacting sulfur with the composition are any suitable conditions that can result in dissolving the sulfur and can include an ambient temperature in the range of from about 0° C. to about 250° C., preferably from 0° C. to 150° C., for a time of from about 1 second to about 10 hours, preferably 10 seconds to 5 hours. The pressure can vary widely from about 0.1 atmosphere to about 30 atmospheres, preferably from about 0.1 atmosphere to about 3 atmospheres.

According to another embodiment of the present invention, a composition is provided which comprises, or consisting essentially of, or consists of an organic sulfide, a base, a surfactant, and optionally, a mercaptan and is present in an amount effective to dissolve sulfur. The scope and quantity of each component of the composition are the same as those disclosed above.

The following examples are provided to further illustrate the practice of the invention and are not intended to limit the scope of the invention of the claims.

EXAMPLE I

This example illustrates the process of the present invention employing a composition comprising dimethyl disulfide, sodium methanethiolate, and an ethoxylated alcohol for dissolving sulfur.

To a 200 ml flask equipped with thermowell, magnetic stir bar, and condenser with $N_2$ inlet on top was added 0.20 g of 18.8% $CH_3SNa$ solution (aqueous), 0.60 g of TERGITOL® 15-S-7 (ethoxylated alcohol from Union Carbide), and 23.5 g of dimethyl disulfide. The mixture was heated to 50° C., and 16.0 g of elemental sulfur (powdered flowers of sulfur) was added in portions over 3–4 minutes. The sulfur dissolved immediately in the reaction mixture which became orange in color.

EXAMPLE II

This example illustrates the invention process using a composition comprising dimethyl disulfide, sodium hydroxide, and an ethoxylated alcohol to dissolve sulfur.

The run was carried out the same way as in Example I except that 0.20 g of 50% aqueous NaOH replaced the $CH_3SNa$. Sulfur was immediately dissolved upon being added to the flask.

EXAMPLE III

This example shows the invention process employing a composition comprising dimethyl disulfide, sodium hydrosulfide, and an ethoxylated alcohol for dissolving sulfur.

The run was carried out the same way as in Example I except the amounts of regents were as follows: 23.5 g of dimethyl disulfide, 0.15 g of 45% NaSH (aqueous), 0.5 g of TERGITOL® 15-S-7, and 24.0 g of element sulfur. Again, sulfur was completely, immediately dissolved when added.

EXAMPLE IV

This example is a comparative example illustrating that without using a surfactant as component of the composition, the solubility of sulfur in the composition was very poor.

The run was carried out the same way as in Example I but no TERGITOL® 15-S-7 was included. The sulfur did not dissolve in the composition to any significant extent even after about 30 minutes (only about 5–10 weight % of the sulfur was dissolved).

EXAMPLE V

This is another comparative example illustrating that an alkylamine does not work well as a component for the composition for dissolving sulfur.

The run was carried out the same way as in Example I except the $CH_3SNa$ was replaced by 0.40 g of triethylamine. The sulfur did not dissolve in the composition to any significant extent even after 1 hour.

EXAMPLE VI

This example illustrates that sulfur can be readily dissolved by the invention composition at room temperature (about 25° C.).

The runs were carried out the same as that described in Example I except that 9.7 g of dimethyl disulfide, 0.20 g of TERGITOL® 15-S-7, and 0.08 g of 45% NaSH were used to form the composition and the temperature was at room temperature. It was found that 5 g of powdered sulfur was dissolved in 70 seconds; 10 g of powdered sulfur was dissolved in 2.5 minutes; and 12 g of sulfur was dissolved in 5 minutes. However, it was found that 15 g of sulfur did not completely dissolve in 60 minutes.

EXAMPLE VII

This example illustrates that sodium hydroxide can be used as a component of the composition for dissolving sulfur at room temperature.

The run was carried out the same way as in Example VI except that 0.08 g of 50% sodium hydroxide solution was used in place of sodium hydrosulfide. It was found that this composition took longer than those disclosed in Example VI to dissolve sulfur. For example, it took almost 10 minutes to dissolve 5 g of sulfur.

EXAMPLE VIII

This example demonstrates that the sulfur-dissolving composition can also contain a mercaptan.

The run was carried out the same as that described in Example VII with the exception that 0.11 g of t-nonyl mercaptan and 0.05 g of sodium hydroxide were used in place of 0.08 g sodium hydroxide in Example VII. It was found that 5 g of sulfur was dissolved in 80 seconds.

EXAMPLE IX

This example shows that sodium methane thiolate can also be used as a component of the invention composition for dissolving sulfur at room temperature.

The run was carried out the same as that described in Example VII except that 0.16 g of 18.8% sodium methanethiolate was used in place of sodium hydroxide. It was fund that 5 g of sulfur was dissolved in about 90 seconds.

The results shown in the above examples clearly demonstrate that the present invention is well adapted to carry out the objects and attain the ends and advantages mentioned was well as those inherent therein. While modifications may be made by those skilled in the art, such modifications are encompassed within the spirit of the present invention as defined by the disclosure and the claims.

That which is claimed:

1. A process comprising contacting sulfur with a composition under a condition sufficient to substantially dissolve said sulfur in said composition wherein said composition comprises an organic sulfide, a base, and a surfactant; said organic sulfide, base, and surfactant are each present in an amount effective to dissolve said sulfur; and said base is not an amine.

2. A process according to claim 1 wherein said organic sulfide has a formula of $R-S_n-R$ wherein each R is a hydrocarbyl radical having 1 to about 30 carbon atoms per molecule of said organic sulfide and n is a number of from 2 to about 10.

3. A process according to claim 2 wherein said hydrocarbyl radical has 1 to 15 carbon atoms per polysulfide molecule and n is a number from 2 to 5.

4. A process according to claim 1 wherein said organic sulfide is dialkyl disulfide.

5. A process according to claim 1 wherein said organic sulfide is dimethyl disulfide.

6. A process according to claim 1 wherein said base is selected from the group consisting of inorganic bases, organic bases, and combinations of any two or more thereof.

7. A process according to claim 1 wherein said base is selected from the group consisting of tetramethylammonium hydroxide, tetraethylammonium hydroxide, tetrapropylammonium hydroxide, tetramethylammonium bisulfide, tetraethylammonium bisulfide, lithium hydroxide, sodium hydroxide, sodium hydrosulfide, sodium bisulfide, potassium hydroxide, potassium hydrosulfide, potassium bisulfide, calcium hydroxide, magnesium hydroxide, sodium bicarbonate, sodium carbonate, sodium sulfide, sodium oxide, magnesium oxide, calcium oxide, calcium carbonate, sodium phenoxide, barium phenoxide, calcium phenoxide, $R^1OM$, $R^1SM$, and combinations of any two or more thereof; where $R^1$ is selected from the group consisting of $C_1-C_{18}$ alkyl radicals, and combinations of any two or more thereof; and M is selected from the group consisting of alkali metals, alkaline earth metals, and combinations of any two or more thereof.

8. A process according to claim 1 wherein said base is sodium hydroxide.

9. A process according to claim 1 wherein said base has the formula of $R^1SM$ which is prepared in-situ by combining an alkali metal hydroxide or an alkaline earth metal hydroxide with a mercaptan wherein $R^1$ is selected from the group consisting of $C_1-C_{18}$ alkyl radicals, and combinations of any two or more thereof and M is selected from the group consisting of alkali metals, alkaline earth metals, and combinations of any two or more thereof.

10. A process according to claim 1 wherein said base is sodium hydrosulfide.

11. A process according to claim 10 wherein said sodium hydrosulfide is prepared in-situ by combining hydrogen sulfide and sodium hydroxide.

12. A process according to claim 1 wherein said base is sodium methanethiolate.

13. A process according to claim 12 wherein said sodium methanethiolate is prepared in-situ by combining methyl mercaptan and sodium hydroxide.

14. A process according to claim 1 wherein said surfactant is selected from the group consisting of alkoxylated compounds, quaternary ammonium salts, alkali metal alkyl sulfates, alkali metal salts of alkanoic acids, alkali metal salts of alkaryl sulfonic acids, 1-alkyl pyridinium salts, and combinations of any two or more thereof.

15. A process according to claim 1 wherein said surfactant is an alkoxylated compound selected from alkoxylated mercaptans, alkoxylated alcohols, sulfates of alkoxylated alcohols, alkoxylated phenols, sulfates of alkoxylated phenols, and combinations of any two or more thereof.

16. A process according to claim 15 wherein said alkoxylated compound has the formula of $R^2O(CH_2CH_2O)_7H$ wherein $R^2$ is a secondary alkyl radical having 11 to 15 carbon atoms and 7 is the averaged number of the ethylene oxide units.

17. A process for dissolving a sulfur deposit or sulfur plug comprising contacting said sulfur deposit or sulfur plug with a composition which comprises an organic sulfide, a base, and a surfactant wherein said organic sulfide has the formula of R—S$_n$—R; said base is not an amine and is selected from the group consisting of inorganic bases and organic bases, and combinations of any two or more thereof; said surfactant is an alkoxylated compound selected from the group consisting of alkoxylated alcohols, alkoxylated mercaptans, and combinations of any two or more thereof; each R is a hydrocarbyl radical having 1 to about 30 carbon atoms; and n is a number of 2 to about 10.

18. A process according to claim 17 wherein said base is selected from the group consisting of tetramethylammonium hydroxide, tetraethylammonium hydroxide, tetrapropylammonium hydroxide, tetramethylammonium bisulfide, tetraethylammonium bisulfide, lithium hydroxide, sodium hydroxide, sodium hydrosulfide, sodium bisulfide, potassium hydroxide, potassium hydrosulfide, potassium bisulfide, calcium hydroxide, magnesium hydroxide, sodium bicarbonate, sodium carbonate, sodium oxide, magnesium oxide, calcium oxide, calcium carbonate, sodium phenoxide, barium phenoxide, calcium phenoxide, R$^1$OM, R$^1$SM, and combinations of any two or more thereof; where R$^1$ is selected from the group consisting of C$_1$–C$_{18}$ alkyl radicals, and combinations of any two or more thereof; M is selected from the group consisting of alkali metals, alkaline earth metals, and combinations of any two or more thereof; said alkoxylated compound is an alkoxylated alcohol; each R is a hydrocarbyl radical having 1 to about 20 carbon atoms; and n is a number from about 2 to about 8.

19. A process according to claim 17 wherein said base is selected from the group consisting of sodium hydroxide, sodium hydrosulfide, sodium methanethiolate, and combinations of any two or more thereof; each R is a hydrocarbyl radical having 1 to 15 carbon atoms in each organic sulfide molecule; said surfactant is an ethoxylated alcohol; and n is a number from 2 to 5.

20. A process according to claim 19 wherein said ethoxylated alcohol has a formula of R$^2$O(CH$_2$CH$_2$O)$_7$H wherein R$^2$ is a secondary alkyl radical having 11 to 15 carbon atoms and 7 is an average number of the ethylene oxide units; and n is 2.

21. A process according to claim 20 wherein said base is selected from the group consisting of sodium hydroxide, sodium methanethiolate, sodium hydrosulfide, and combinations of any two or more thereof.

22. A process according to claim 20 wherein said organic sulfide is dimethyl disulfide.

23. A process for dissolving a sulfur deposit or sulfur plug in a location selected from the group consisting of gas wells, oil wells, conduits, vessels, and combinations of any two or more thereof comprising contacting, said sulfur deposit or sulfur plug with a composition which comprises dimethyl disulfide, a base, and an ethoxylated alcohol having a formula of R$^2$O(CH$_2$CH$_2$O)$_7$H, wherein said base is selected from the group consisting of sodium hydroxide, sodium hydrosulfide, sodium methanethiolate, and combinations of any two or more thereof; and R$^2$ is a secondary alkyl radical having 11 to 15 carbon atoms and 7 is an average number of the ethylene oxide units.

24. A process according to claim 23 wherein said composition further comprises t-nonyl mercaptan.

25. A composition comprising an organic sulfide, a base, and a surfactant wherein:

said organic sulfide has a formula of R—S$_n$—R wherein each R is a hydrocarbyl radical having 1 to about 30 carbon atoms per molecule of said organic sulfide and n is a number of from 2 to about 10;

said base is selected from the group consisting of tetramethylammonium hydroxide, tetraethylammonium hydroxide, tetrapropylammonium hydroxide, tetramethylammonium bisulfide, tetraethylammonium bisulfide, lithium hydroxide, sodium hydroxide, sodium hydrosulfide, sodium bisulfide, potassium hydroxide, potassium hydrosulfide, potassium bisulfide, calcium hydroxide, magnesium hydroxide, sodium bicarbonate, sodium carbonate, sodium sulfide, sodium oxide, magnesium oxide, calcium oxide, calcium carbonate, sodium phenoxide, barium phenoxide, calcium phenoxide, R$^1$OM, R$^1$SM, and combinations of any two or more thereof; wherein R$^1$ is selected from the group consisting of C$_1$–C$_{18}$ alkyl radicals, and combinations of any two or more thereof and M is selected from the group consisting of alkali metals, alkaline earth metals, and combinations of any two or more thereof; and said surfactant is selected from the group consisting of alkoxylated compounds, quaternary ammonium salts, alkali metal alkyl sulfates, alkali metal salts of alkanoic acids, alkali metal salts of alkaryl sulfonic acids, 1-alkyl pyridinium salts, and combinations of any two or more thereof.

26. A composition according to claim 25 wherein said organic sulfide is dimethyl disulfide; said base is selected from the group consisting of sodium hydroxide, sodium hydrosulfide, sodium methanethiolate, and combinations of any two or more thereof; and said surfactant is an alkoxylated compound selected from alkoxylated mercaptans, alkoxylated alcohols, sulfates of alkoxylated alcohols, alkoxylated phenols, sulfates of alkoxylated phenols, and combinations of any two or more thereof.

27. A composition according to claim 26 wherein said alkylated compound has a formula of R$^2$O(CH$_2$CH$_2$O)$_7$H wherein R$^2$ is a secondary alkyl radical having 11 to 15 carbon atoms and 7 is an average number of the ethylene oxide units.

28. A process according to claim 1 wherein said composition is prepared by combining said organic sulfide, said base, and said surfactant.

29. A composition according to claim 25 wherein said composition is prepared by combining said organic sulfide, said base, and said surfactant.

\* \* \* \* \*